(12) United States Patent
Nakazawa (10) Patent No.: US 8,996,196 B2
(45) Date of Patent: Mar. 31, 2015

(54) INFORMATION PROVISION DEVICE AND INFORMATION PROVISION METHOD

(75) Inventor: Takuji Nakazawa, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 47 days.

(21) Appl. No.: 13/641,823

(22) PCT Filed: Apr. 13, 2011

(86) PCT No.: PCT/JP2011/059177
§ 371 (c)(1),
(2), (4) Date: Oct. 17, 2012

(87) PCT Pub. No.: WO2011/132583
PCT Pub. Date: Oct. 27, 2011

(65) Prior Publication Data
US 2013/0035804 A1 Feb. 7, 2013

(30) Foreign Application Priority Data
Apr. 19, 2010 (JP) ................................ 2010-095805

(51) Int. Cl.
*G05D 1/00* (2006.01)
*G05D 3/00* (2006.01)
(Continued)

(52) U.S. Cl.
CPC ...... *G01C 21/3469* (2013.01); *G08G 1/096716* (2013.01); *G08G 1/096775* (2013.01);
(Continued)

(58) Field of Classification Search
CPC ... Y02T 10/7005; Y02T 90/16; Y02T 10/705; Y02T 10/7088; Y02T 90/163; Y02T 90/12; Y02T 90/127; Y02T 10/7044; B60L 11/1824; B60L 15/20; B60L 1/003; B60L 11/005; B60L 11/1838; B60L 11/1846; B60L 11/1816; B60L 11/1844; B60L 11/1818; B60W 20/00; B60W 10/06; B60W 20/10; B60W 40/02; G01C 21/3469; G01C 21/3697; G01C 21/3667; G01C 21/26
USPC ......... 701/22, 1, 99, 29, 31.4, 34.4, 533, 113, 701/102; 320/108, 104, 145, 101, 150
See application file for complete search history.

(56) References Cited

U.S. PATENT DOCUMENTS 5,815,824 A * 9/1998 Saga et al. .................... 701/22
6,864,807 B2 * 3/2005 Todoriki et al. .............. 340/988
(Continued)

FOREIGN PATENT DOCUMENTS

EP 2172740 A1 * 4/2010 ............. G01C 21/36
JP 2007-274885 A 10/2007
(Continued)

*Primary Examiner* — Calvin Cheung
*Assistant Examiner* — Luis A Martinez Borrero
(74) *Attorney, Agent, or Firm* — Foley & Lardner LLP (57) ABSTRACT

In order to suppress charge amount shortage in a predetermined area, an information provision device has an acquisition means that acquires travelling information of an electric vehicle on which a secondary battery 204 is mounted; a charge output estimation means that estimates, on the basis of the travelling information, a charge output value of a charging device which is provided in a predetermined area; a judgment means that judges, on the basis of the estimated charge output value, whether there is a risk that shortage of a charge amount will occur in the predetermined area; and an information provision means that provides recommendation information concerning charge of the vehicle to the electric vehicle according to a judgment result of the judgment means.

14 Claims, 4 Drawing Sheets

(51) Int. Cl.
*G06F 7/00* (2006.01)
*G06F 17/00* (2006.01)
*G01C 21/34* (2006.01)
*G08G 1/0967* (2006.01)
*B60L 11/18* (2006.01)
*H02J 7/00* (2006.01)

(52) U.S. Cl.
CPC ........... *B60L11/1844* (2013.01); *H02J 7/0004* (2013.01); *Y02T 10/7088* (2013.01); *Y02T 10/7005* (2013.01); *Y02T 90/161* (2013.01); *Y02T 90/163* (2013.01); *Y02T 90/14* (2013.01); *Y02T 90/128* (2013.01); *Y04S 10/126* (2013.01); *Y02E 60/721* (2013.01)
USPC ..... 701/1; 701/22; 701/24; 701/25; 701/29.1; 701/32.5

(56) References Cited

U.S. PATENT DOCUMENTS

| | | | |
|---|---|---|---|
| 8,041,522 B2* | 10/2011 | Plett | 702/63 |
| 2006/0111854 A1* | 5/2006 | Plett | 702/63 |
| 2007/0208467 A1* | 9/2007 | Maguire et al. | 701/22 |
| 2007/0213921 A1 | 9/2007 | Yamaguchi | |
| 2007/0299620 A1* | 12/2007 | Yun et al. | 702/63 |
| 2008/0021628 A1* | 1/2008 | Tryon | 701/99 |
| 2008/0162059 A1* | 7/2008 | Murakami | 702/63 |
| 2009/0024338 A1* | 1/2009 | Suzuki | 702/63 |
| 2009/0070052 A1* | 3/2009 | Taniguchi et al. | 702/63 |
| 2009/0140742 A1* | 6/2009 | Koch et al. | 324/426 |
| 2010/0000809 A1* | 1/2010 | Nishi et al. | 180/65.29 |
| 2010/0138098 A1* | 6/2010 | Takahara et al. | 701/29 |
| 2010/0161518 A1* | 6/2010 | Littrell | 705/412 |
| 2010/0185384 A1* | 7/2010 | Naito et al. | 701/200 |
| 2010/0225475 A1* | 9/2010 | Karch et al. | 340/540 |
| 2011/0133693 A1* | 6/2011 | Lowenthal et al. | 320/109 |
| 2011/0246004 A1* | 10/2011 | Mineta | 701/22 |
| 2011/0246019 A1* | 10/2011 | Mineta | 701/33 |

FOREIGN PATENT DOCUMENTS

| | | |
|---|---|---|
| JP | 2007-295717 A | 11/2007 |
| JP | 2009-42095 A | 2/2009 |
| JP | 2010-279108 A | 12/2010 |
| WO | WO 2010/137307 A1 | 12/2010 |

* cited by examiner

INFORMATION PROVISION DEVICE AND INFORMATION PROVISION METHOD

TECHNICAL FIELD

The present invention relates to an information provision device and an information provision method for vehicles.

BACKGROUND ART

A controller that controls a charging device creates a load curve of electric power consumption in which consumption of commercial power is expected according to the lapse of time, and sets a charge start time to a time period when electric power demand shown by the load curve is low, then notifies the charging device of the charge start time. The charging device that charges an object to be charged starts the charge at the charge start time notified by the controller. This power supply control system has been known (Patent Document 1).

In the above prior art system, however, although the charge start time of the charging device can be adjusted by the controller, the object to be charged can not be managed at all. Thus there is a possibility that shortage of a charge amount for the demand of the power will occur due to the face that the objects to be charged concentrate in a predetermined area.

CITATION LIST

Patent Document

Patent Document 1: Japanese Patent Provisional Publication Tokkai No. 2007-295717

SUMMARY OF THE INVENTION

An object of the present invention is to provide an information provision device and an information provision method, which suppress the charge amount shortage in the predetermined area.

The present invention judges, on the basis of a charge output value of a charging device provided in the predetermined area, whether there is a risk that the shortage of the charge amount will occur in the predetermined area, and provides electric vehicles with recommendation information concerning the charge of the vehicle according to the judgment result.

According to the present invention, since the recommendation information concerning the charge of the vehicle is provided to the electric vehicles, it is possible to prevent the vehicles, which will be charged, from concentrating in the predetermined area. As a consequence, the occurrence of the shortage in the charge amount of the charging device provided in the predetermined area can be prevented.

DESCRIPTION OF EMBODIMENTS

In the following description, embodiments of the present invention will be explained with reference to the drawings.

First Embodiment

Figure 1:
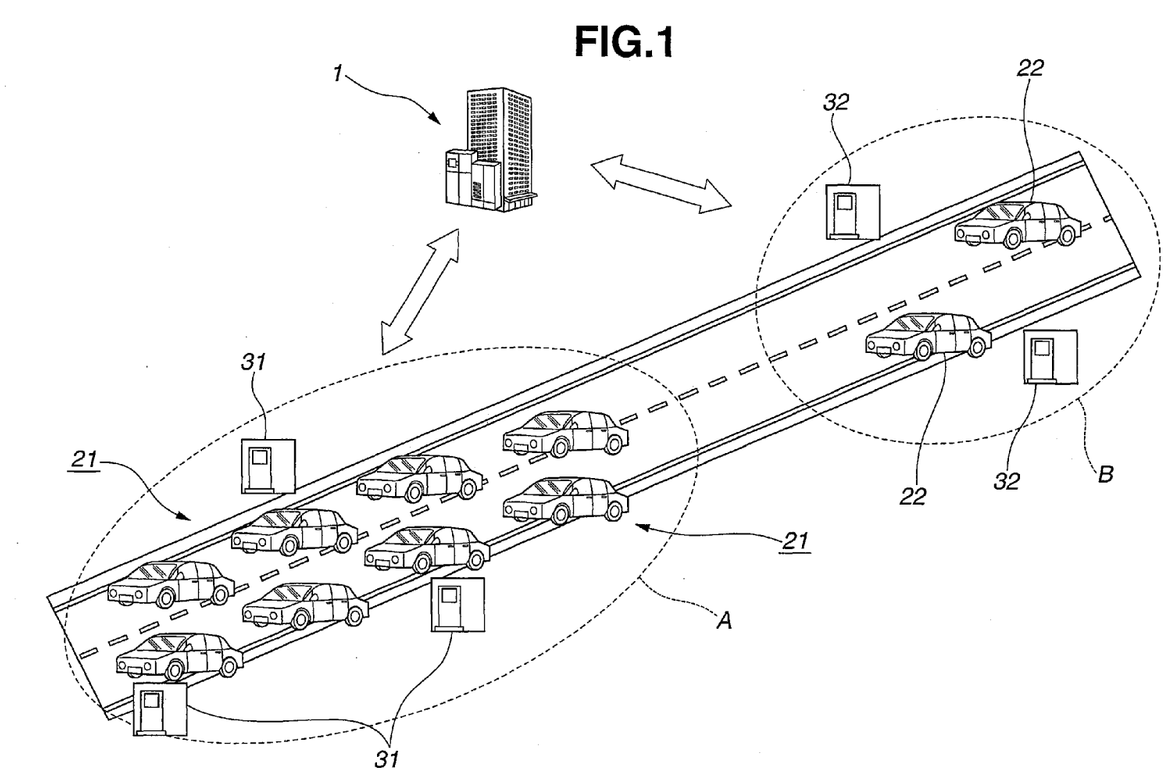
FIG. 1 is a schematic view of an information provision system including an information provision device according to an embodiment of the present invention.
Figure 2:
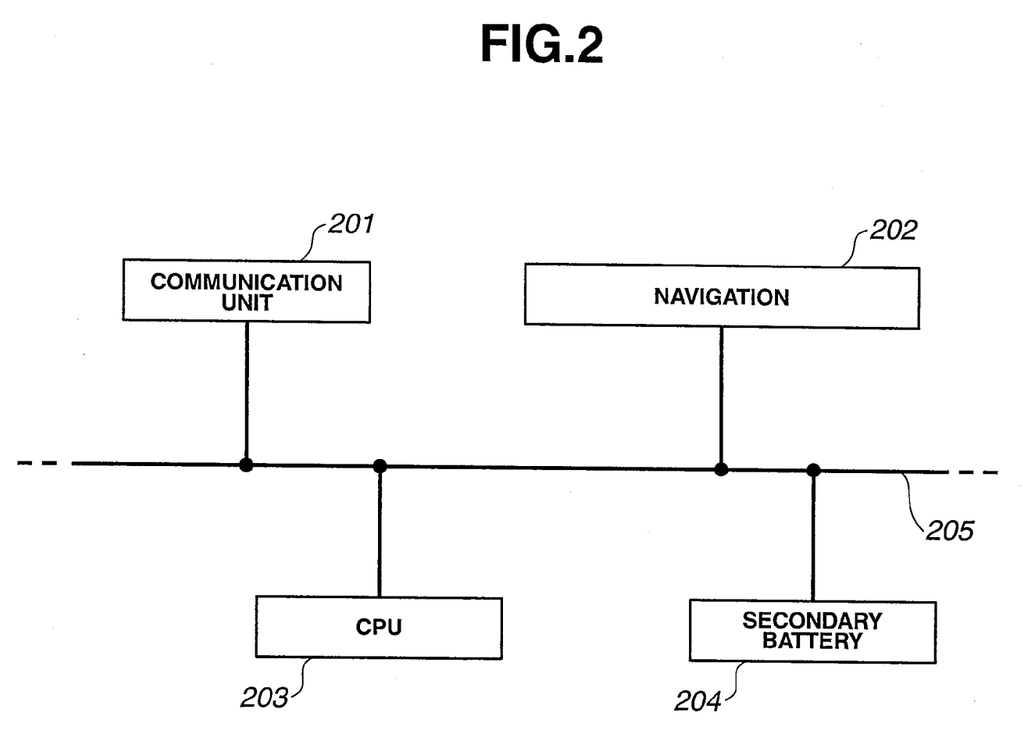
FIG. 2 is a block diagram in a vehicle shown in FIG. 1.
Figure 3:
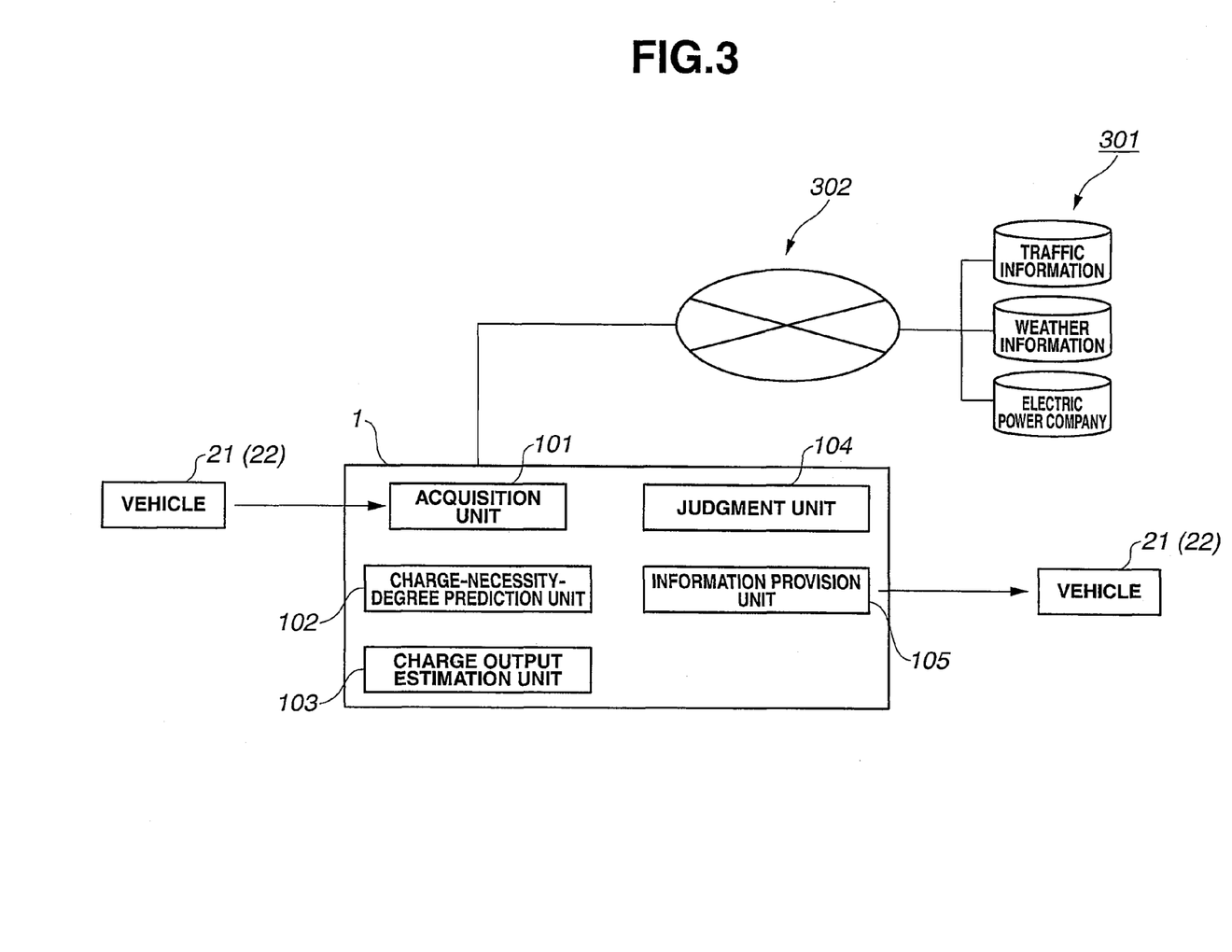
FIG. 3 is a block diagram in the information provision system shown in FIG. 1.

An information provision device of the present embodiment will be explained using FIGS. 1 to 3. FIG. 1 is a schematic view of an information provision system including the information provision device of the present embodiment. FIG. 2 is a block diagram in a vehicle included in the information provision system shown in FIG. 1. FIG. 3 is a block diagram of the information provision system including the information provision device of the present embodiment.

The information provision device 1 of the present embodiment is a part of the information provision system shown in FIG. 1. The information provision device 1 performs transmission/reception of signal with a vehicle 21 and a vehicle 22. The vehicle 21 and the vehicle 22 are electric vehicles on which a secondary battery is mounted. The secondary battery is charged by power from a charging device 31 or a charging device 32. The vehicle 21 and the vehicle 22 travel, for instance, on the freeway. The vehicle 21 travels with other vehicles 21 in congested traffic, namely that the traffic is building up around the vehicle 21 on the freeway. On the other hand, the vehicle 22 and other vehicles 22 do not travel in congested traffic, namely that the traffic is not building up around the vehicle 22 on the freeway.

The charging device 31 and the charging device 32 are provided, for instance, in a service area etc. on the freeway. The charging devices 31 are provided in an area A where the vehicles 21 travel, while the charging devices 32 are provided in an area B where the vehicles 22 travel. Here, in FIG. 1, a predetermined area including the charging devices 31 is the area A, and a predetermined area including the charging devices 32 is the area B. That is, a nearest charging station for the vehicle 21 is the charging device 31, and a nearest charging station for the vehicle 22 is the charging device 32. The charging device 31 and the charging device 32 perform transmission/reception of signal with the information provision device 1. The information provision device 1 controls the charge of the charging device 31 and the charging device 32.

As shown in FIG. 2, the vehicle 21 has a communication unit 201, a navigation 202, a CPU 203, the secondary battery 204 and a vehicle LAN 205. The communication unit 201, the navigation 202, the CPU 203 and the secondary battery 204 are connected together through the vehicle LAN 205. The navigation 202 has GPS function, then displays a present position of the vehicle, searches a route from the present position of the vehicle to a destination, and guides the vehicle along a predetermined travelling route. The secondary battery 204 is a power source of the vehicle 21. The secondary battery 204 is charged by power supply, for example, from the charging device 31 or the charging device 32, and charged also by a regenerative braking control of a motor (not shown). The CPU 203 checks or controls a state of charge of the secondary battery 204, and detects a charge capacity of the secondary battery 204, for example, by detecting a voltage of the secondary battery 204.

Further, the CPU 203 performs transmission/reception of signal with external sources situated outside the vehicle 21 by controlling the communication unit 201. Travelling information of the vehicle 21 is then transmitted to the information provision device 1 by the communication unit 201. The travelling information includes information that indicates the state of the secondary battery 204, information that is detected by the navigation 202 and information that indicates a condition of the vehicle 21. For instance, a remaining capacity of the secondary battery 204, the predetermined travelling route up to the destination, a transit point, an estimated time of arrival, the present position of the vehicle 21, a speed of the vehicle 21, direction of the vehicle 21 and so on are included in the travelling information. With regard to a configuration of the vehicle 22, it is the same as that of the vehicle 21. Its explanation is therefore omitted here.

Next, the information provision device 1 of the present embodiment and the information provision system including the information provision device 1 of the present embodiment will be explained using FIG. 3. The information provision device 1 has an acquisition unit 101, a charge-necessity-degree prediction unit 102, a charge output estimation unit 103, a judgment unit 104 and an information provision unit 105. The information provision device 1 performs transmission/reception of the information with an external server 301 through a communication line 302. The external server 301 has road traffic information, weather information and information from an electric power company. In the information from the electric power company, a current power output value and a rated output value, etc. of each of the charging device 31 and the charging device 32 are included.

The acquisition unit 101 acquires or obtains the travelling information that is transmitted from the vehicles 21, 22 and the external server 301. The charge-necessity-degree prediction unit 102 predicts a degree of necessity for the vehicles 21, 22 to be charged, using the travelling information. In the travelling information, the information transmitted from the communication unit 201 of the vehicles 21, 22, topographical information and traffic information of road on which the vehicles 21, 22 travel and weather information of a place where the vehicles 21, 22 travel, transmitted from the external server 301, are included.

The necessity degree of the charge indicates a possibility of the charge of the vehicles 21, 22. The higher the necessity degree of the charge of the vehicles 21, 22, the greater the tendency to be charged by the charging devices 31, 32. Further, the charge-necessity-degree prediction unit 102 previously divides a road map into certain areas, then predicts the necessity degree of the charge of the vehicles 21, 22 that travel on the road in the certain areas. The necessity degree of the charge is calculated for each certain area. Additionally, the certain areas are set in accordance with positions of the charging devices 31, 32. With respect to a prediction method of the necessity degree of the charge, it will be explained later.

The charge output estimation unit 103 estimates a charge output value of each of the charging devices 31, 32 according to the necessity degree of the charge predicted by the charge-necessity-degree prediction unit 102. The charge output value indicates an amount of the electric power (electric energy) of the charging devices 31, 32 for the supply to the vehicles 21, 22, of a casa where the vehicles 21, 22 are charged by the charging devices 31, 32 according to the necessity degree of the charge. The charge output value is not a value indicating the amount of the electric power that is being supplied by the charging devices 31, 32 at the present moment, but a value that is calculated on the assumption that the vehicles 21, 22 of the number of vehicles according to the necessity degree of the charge are charged by an amount of a charge capacity according to the necessity degree of the charge. The charge output value is calculated for each certain area.

The judgment unit 104 compares the charge output value estimated by the charge output estimation unit 103 with a charge output threshold value. The charge output threshold value corresponds to the rated output values of the charging devices 31, 32 included in the respective predetermined areas. In a case where the charge output value exceeds the charge output threshold value in the predetermined area, this indicates that shortage of a charge amount of the charging devices 31, 32 included in the respective predetermined areas is going to occur.

The information provision unit 105 transmits recommendation information concerning the charge of the vehicle to the vehicles 21, 22 according to a judgment result of the judgment unit 104. In the recommendation information, information of an installation position of the charging devices 31, 32, information of charge amount of the vehicles 21, 22, information of type of the charging devices 31, 32, information of the travelling route of the vehicles 21, 22, information of a waiting time of the charge of the charging devices 31, 32, information of a charge time of the charging devices 31, 32 and so on are included. The recommendation information is information for helping the vehicles 21, 22 that receive this information to efficiently carrying out the charge, also as described later, the recommendation information is information for suppressing the charge output value in the predetermined area to within the charge output threshold value.

Next, a control of the information provision device 1 of the present embodiment will be explained.

First, the information provision device 1 divides the map into the certain areas so as to correspond to the installation positions of the charging devices 31, 32, and previously sets the charge output threshold value of the area. The charge output threshold value corresponds to the respective rated output values of the charging devices 31, 32 provided in the areas. For example, in FIG. 1, the charge output threshold value of the area A corresponds to the rated output value of the charging device 31, and the charge output threshold value of the area B corresponds to the rated output value of the charging device 32.

Then, the charge-necessity-degree prediction unit 102 predicts the necessity degree of the charge of each area from the travelling information obtained by the acquisition unit 101. Here, the prediction method of the necessity degree of the charge will be explained in detail. The charge-necessity-degree prediction unit 102 predicts the charging devices 31, 32 by which the vehicles 21, 22 are charged and predicts the charge amounts, from the position information, the predetermined travelling route and the current remaining capacity of the battery of each of the vehicles 21, 22. For instance, referring to FIG. 1, a possibility that a vehicle 21 whose remaining capacity is less than 30 percent among a vehicle group of the vehicles 21 in the area A will be charged at the nearest charging device 31 is strong. A possibility that a vehicle 22 whose remaining capacity is small among a vehicle group of the vehicles 22 in the area B will be charged at the nearest charging device 32 is strong. In the vehicle group of the vehicles 22 in the area B, there is also a vehicle 22 which would be charged by the charging device 31 in the area A, because the remaining capacity of this vehicle 22 is still large but is going to be less than 30 percent in the future, considering the travelling route from the present position to an arrival position. In this case, the charge-necessity-degree prediction unit 102 predicts that there is a possibility that this vehicle 22 will be charged by the charging device 31. In this manner, the vehicle which would be charged at the area A is determined, and the number of the determined vehicles is set as the necessity degree of the charge of the area A. That is, the charge-necessity-degree prediction unit 102 allocates the charging devices 31, 32 to each of the vehicles 21, 22 which would be charged considering the remaining capacity of each of the vehicles 21, 22 and the travelling route from the present position to an arrival position, and the charge-necessity-degree prediction unit 102 predicts the possibility of the charge for each area. Then, this possibility becomes the necessity degree of the charge. Here, the necessity degree of the charge could be calculated as a numerical value that indicates the possibility, for example, using a statistical value such as an expected value.

Further, the charge-necessity-degree prediction unit 102 expects the necessity degree of the charge with the information from the external server 301 included. For instance, the traffic information of the external server 301 is reflected in the above necessity degree by the charge-necessity-degree prediction unit 102. In an area including a traffic jam point, since a load imposed on the secondary battery 204 of the vehicles 21, 22 is heavy, the possibility that the vehicles 21, 22 will be charged at the nearest charging devices 31, 32 is strong. Because of this, the charge-necessity-degree prediction unit 102 predicts the necessity degree of the charge so that the necessity degree of the charge of the area of the case of the traffic jam is higher than that of the same area of the case of no traffic jam. For example, in the area including the traffic jam point, by setting a rate of consumption of the electric power of the secondary battery 204 to be large, the number of vehicles, whose time period when the remaining capacity falls below 30 percent is brought forward or is accelerated, increases. The charge-necessity-degree prediction unit 102 determines such vehicles, then predicts the necessity degree of the charge by adding the number of such vehicles. With this prediction, in the present embodiment, it is possible to increase accuracy of the expectation of the necessity degree of the charge for each area according to road conditions.

Furthermore, the charge-necessity-degree prediction unit 102 could expect the necessity degree of the charge with the weather information from the external server 301 included. For instance, in an area including a road where it is raining heavily, since the load imposed on the secondary battery 204 of the vehicles 21, 22 is heavy because of operation of wiper and accessory or auxiliary devices, consumption of battery capacity increases. Because of this, the charge-necessity-degree prediction unit 102 predicts the necessity degree of the charge so that the necessity degree of the charge of the area of the heavy rain is higher than that of the same area of no heavy rain. For example, in the area including the road where it is raining heavily, by setting the rate of consumption of the electric power of the secondary battery 204 to be large, the number of vehicles, whose time period when the remaining capacity falls below 30 percent is brought forward or is accelerated, increases. The charge-necessity-degree prediction unit 102 determines such vehicles, then predicts the necessity degree of the charge by adding the number of such vehicles. With this prediction, in the present embodiment, it is possible to increase accuracy of the expectation of the necessity degree of the charge for each area according to weather conditions.

Moreover, the charge-necessity-degree prediction unit 102 could expect the necessity degree of the charge with the topographical information from the external server 301 included. For instance, in an area including a road of a steep hill, since the load imposed on the secondary battery 204 of the vehicles 21, 22 is heavy, the consumption of the battery capacity increases. Because of this, the charge-necessity-degree prediction unit 102 predicts the necessity degree of the charge so that the necessity degree of the charge of the area including the steep hill is higher than that of a flat area. For example, in the area including the road of the steep hill, by setting the rate of consumption of the electric power of the secondary battery 204 to be large, the number of vehicles, whose time period when the remaining capacity falls below 30 percent is brought forward or is accelerated, increases. The charge-necessity-degree prediction unit 102 determines such vehicles, then predicts the necessity degree of the charge by adding the number of such vehicles. With this prediction, in the present embodiment, it is possible to increase accuracy of the expectation of the necessity degree of the charge for each area according to topographic features of the road.

Next, the charge output estimation unit 103 estimates the charge output value for each area according to the necessity degree of the charge predicted by the charge-necessity-degree prediction unit 102. Since the necessity degree of the charge is predicted for each area, the amount of the electric power outputted by the charging devices 31, 32 is calculated on the assumption that the vehicles 21, 22 having a possibility of being charged according to the necessity degree will be actually charged by the charging devices 31, 32 provided in the respective areas. Here, since the amount of the charge output is linked with the remaining capacity and the travelling route up to the destination of each of the vehicles 21, 22 which will be charged, the charge output values from the charging devices 31, 32 are calculated with the remaining capacity and the travelling route included.

In a case where the number of the charging devices 31, 32 provided and the type (e.g. a quick charger, a normal charger) of the charging devices 31, 32 are different from each area, even if the necessity degree of the charge is the same between the areas, the charge output value is different between the areas. That is, the necessity degree of the charge and the charge output amount are set so as to correspond to each other for each area.

Next, the judgment unit 104 compares the charge output value with the charge output threshold value for each area. The judgment unit 104 judges that, when the charge output value is higher (or greater) than the charge output threshold value, the shortage of the charge amount of the charging devices 31, 32 will occur. On the other hand, when the charge output value is lower than the charge output threshold value, the judgment unit 104 judges that no shortage of the charge amount of the charging devices 31, 32 will occur.

The information provision unit 105 determines, by the judgment unit 104, vehicles 21, 22 which are linked with the area where the shortage of the charge amount would occur, and provides the recommendation information to the vehicles 21, 22. The vehicles 21, 22 linked with this area are, for example, a vehicle that is travelling from an area except the area where the shortage of the charge amount would occur toward the area of this shortage and also would be charged by the charging devices 31, 32 in the area of this shortage. The possibility that the vehicle will be charged could be determined by referring to the necessity degree of the charge predicted by the charge-necessity-degree prediction unit 102. For instance, when assuming that the charge output value is higher than the charge output threshold value in the area A in FIG. 1, there is no need for a vehicle 22 that has a margin for the remaining capacity among the vehicle group of the vehicles 22 to be charged by the charging device 32, but this vehicle 22 would be charged by the charging device 31. The information provision unit 105 therefore provides the recommendation information to this vehicle 22.

Then, as the recommendation information, the information provision unit 105 transmits, for instance, the position information of the charging devices 31, 32 that are installed outside the area A where the shortage of the charge amount would occur, to this vehicle 22. The position information of the charging devices 31, 32 installed outside the area A is the position information of the charging device 32 in the area B that is located before the area A or position information of a charging device installed in an area that is located ahead of the area A, in the predetermined travelling route including the area A. The vehicle 22 avoids the charging device 31 in the area A which is forecast to be dense with the vehicles upon the charging by receiving the recommendation information, and then can be charged efficiently by other charging devices. In addition, it is possible to suppress the increase of the charge output value in the area A.

Figure 4:
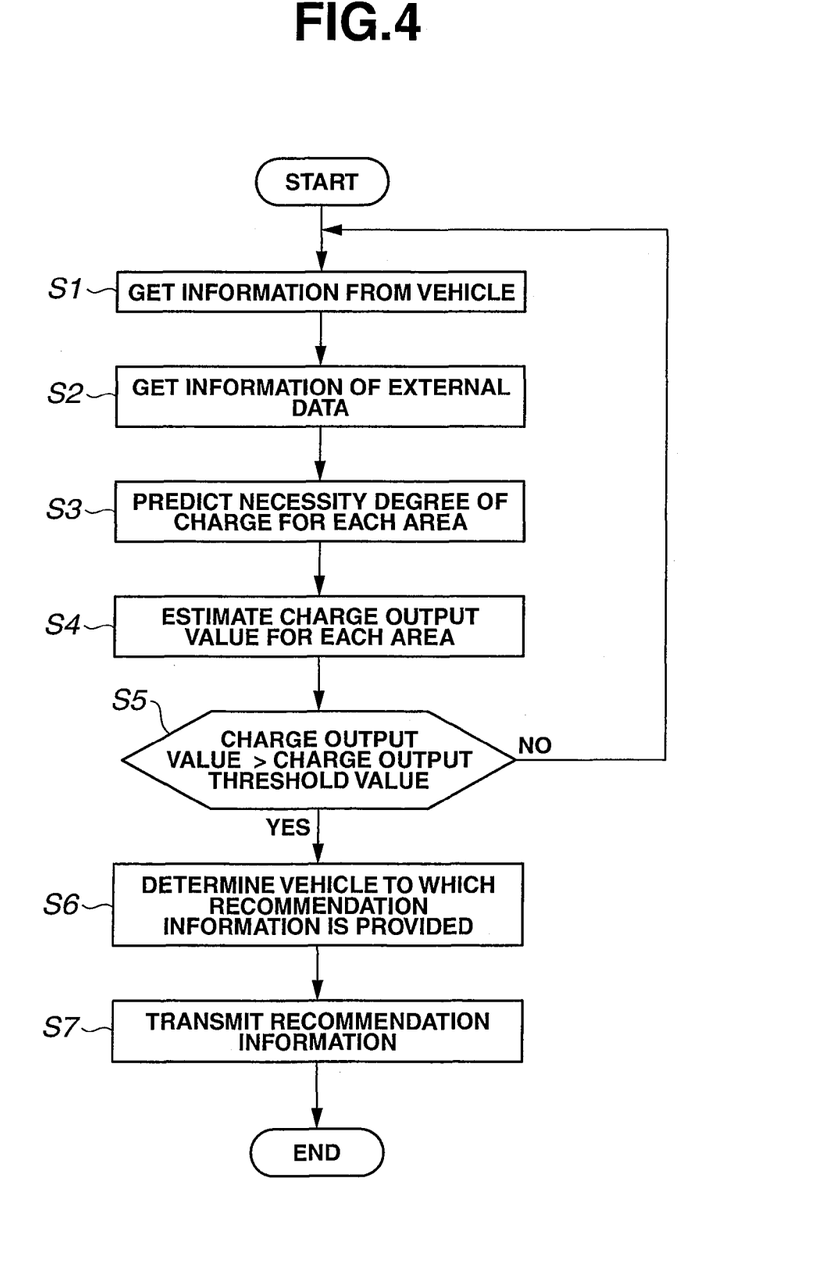
FIG. 4 is a flow chart showing a control procedure of the information provision device shown in FIG. 1.

Next, a control procedure of the information provision unit 105 of the present embodiment will be explained with reference to FIG. 4. FIG. 4 shows the control procedure of the information provision unit 105.

At step S1, the acquisition unit 101 gets the travelling information from the vehicles 21, 22. At step S2, the acquisition unit 101 gets the travelling information of the vehicles 21, 22 from the external server 301. Subsequently, at step S3, the charge-necessity-degree prediction unit 102 predicts the necessity degree of the charge for each pre-set area. At step S4, the charge output estimation unit 103 estimates the charge output value of each area from the necessity degree, of the charge predicted at step S3.

Next, at step S5, the charge output threshold value set for each area and the charge output value estimated at step S4 are compared. When the charge output value is lower than the charge output threshold value, the routine returns to step S1, and repeats the above steps. On the other hand, when the charge output value is higher than the charge output threshold value, at step S6, the information provision unit 105 determines the vehicles 21, 22 to which the recommendation information is transmitted. At step S7, the information provision unit 105 transmits the recommendation information to the vehicles 21, 22 determined at step S6, then the control is terminated.

As described above, in the present embodiment, the necessity degree of the charge in the predetermined area is predicted from the travelling information, the charge output value of the charging devices 31, 32 provided in the predetermined area is estimated according to the necessity degree of the charge, and the charge output value and the charge output threshold value are compared, then the recommendation information concerning the charge of the vehicle is provided to the vehicles 21, 22 from the judgment result. With this control procedure, in the case where there is the risk that the shortage of the charge amount will occur in the predetermined area, since the recommendation information concerning the charge is transmitted to the vehicles 21, 22, it is possible to prevent the vehicles, which have a strong possibility of being charged, from concentrating in the predetermined area. As a consequence, the occurrence of the shortage in the charge amount of the charging devices 31, 32 provided in the respective predetermined areas can be prevented.

Further, in the present embodiment, in the travelling information, at least one of the remaining capacity of the secondary battery 204, the information of the predetermined travelling route of each of the vehicles 21, 22, the topographical information of the road on which the vehicles 21, 22 travel, the traffic information of the road on which the vehicles 21, 22 travel and the weather information of the place where the vehicles 21, 22 travel is included. With this information, in the present embodiment, it is possible to accurately expect the necessity degree of the charge according to a change of the remaining capacity of the vehicles 21, 22 travelling in the predetermined area or outside the area. Furthermore, in the present embodiment, since the information of the predetermined travelling route of each of the vehicles 21, 22 is included in the travelling information, the possibility of the charge of the vehicles 21, 22 that are travelling outside the predetermined area can be reflected in the necessity degree of the charge of the predetermined area, it is therefore possible to increase the accuracy of the expectation of the necessity degree of the charge. Moreover, in the present embodiment, since the topographical information of the road on which the vehicles 21, 22 travel and the weather information of the place where the vehicles 21, 22 travel are included in the travelling information, it is possible to accurately expect the necessity degree of the charge according to travelling conditions.

In addition, in the present embodiment, the traffic information of the road on which the vehicles 21, 22 travel is included in the travelling information. Thus, although the consumption of the secondary battery 204 increases in the traffic jam area and density of the vehicles 21, 22 in the area increases, since the necessity degree of the charge becomes high by theses increases, it is possible to prevent the vehicles, which will be charged by the charging devices 31, 32, from concentrating in the area.

Additionally, in the present embodiment, the recommendation information includes the position information of the charging devices 31, 32. Therefore, since the vehicles 21, 22 receiving the recommendation information can obtain the positions of the charging devices 31, 32 to be efficiently charged, a user of the vehicle can charge the vehicles 21, 22 more comfortably and efficiently.

In the present embodiment, in the case where the charge output value exceeds the charge output threshold value in the predetermined area, as the recommendation information, the position information of the charging device that is installed outside the predetermined area is provided to the vehicles 21, 22 travelling toward the predetermined area. The vehicle receiving the recommendation information can therefore be charged while avoiding the predetermined area which is forecast to be dense with the vehicles for the charge. The user of the vehicle can consequently charge the vehicles 21, 22 more comfortably and efficiently. Further, since it is possible to suppress concentration of the demand for the charge on the charging devices 31, 32 provided in the respective predetermined areas, the shortage of the charge amount of the charging devices 31, 32 can be prevented.

Here, when predicting the necessity degree of the charge, the information of the predetermined travelling route is not necessarily required. The necessity degree of the charge could be estimated using the information of the remaining capacity of the secondary battery 204. For instance, in a certain area, the charge-necessity-degree prediction unit 102 could judge that the vehicles 21, 22 whose remaining capacity of the secondary battery 204 is less than 30 percent have the possibility of being charged, then predicts the necessity degree of the charge from the remaining capacity of the battery of the vehicle included in the area.

Also, in the present embodiment, an output value that is lower than the rated output values of the charging devices 31, 32 could be set to the charge output threshold value.

Further, as the charge output threshold value, a maximum power supply value in the predetermined area and information of electric power demand except the vehicle charging device, stored in the external server 301, could be used. For example, a difference between the maximum power supply value and the electric power demand except the charging device could be set to the charge output threshold value. Alternatively, the maximum power supply value might be set to the charge output threshold value, then the judgment unit 104 compares an additional value of the charge output value estimated by the charge output estimation unit 103 and the electric power demand except the vehicle charging device with the charge output threshold value.

In the present embodiment, the necessity degree of the charge is estimated using the information transmitted from the external server 301. However, the charge output threshold value could be set according to this information. For instance, since the necessity degree of the charge becomes high in the area of the traffic jam, the charge output threshold value is previously set to be low. With this setting, as compared with a case of no traffic jam, the judgment unit 104 of the present embodiment tends to judge that the shortage of the charge amount will occur. It is thus possible to prevent the occurrence of the shortage in the charge amount according to the travelling conditions in the area.

The necessity degree of the charge is not necessarily expected using only one of some information included in the travelling information, but could be expected by combining some information or combining the information with other information.

Further, the recommendation information is not only the position information of the charging devices 31, 32, but could be provided with the other information combined.

Furthermore, the charge-necessity-degree prediction unit 102 could expects the necessity degree of the charge using temperature information as the weather information from the external server 301. In an area where the temperature is high, since a rate of operation of an air conditioner rises and the load imposed on the secondary battery 204 of the vehicles 21, 22 is heavy, the consumption of the battery capacity increases. Because of this, the charge-necessity-degree prediction unit 102 predicts the necessity degree of the charge so that the necessity degree of the charge in the high temperature area is higher than that in a low temperature area. With this prediction, in the present embodiment, it is possible to increase the accuracy of the expectation of the necessity degree of the charge for each area according to weather conditions.

Moreover, in the present embodiment, as the travelling information, the necessity degree of the charge could be expected using, for instance, information of travel distance per day. In a case where the vehicles 21, 22 travel for long time, a possibility that the secondary battery 204 will be charged is strong. Therefore, by reflecting the travel distance in the necessity degree of the charge, it is possible to increase the accuracy of the expectation of the necessity degree of the charge for each area.

In addition, in the present embodiment, when expecting the necessity degree of the charge or estimating the charge output amount, the necessity degree of the charge could be expected or the charge output amount could be estimated using statistical data of the past. For example, in the certain area, there is a case where a measure of trend appears in the number of the vehicles, time of the occurrence of the traffic jam and so on. Therefore, by correlating travelling conditions of the certain area with data of the necessity degree of the charge or the charge output amount, this data is stored as data of the past. Then, by grasping or retrieving the travelling conditions of this area from the travelling information and checking the data of the past of the necessity degree of the charge or the charge output amount, the necessity degree of the charge is expected or the charge output amount is estimated together with the obtained travelling information. With this expectation or estimation, these accuracies can be increased.

In the present embodiment, although the predetermined area is previously set, the predetermined area could be set according to the necessity degree of the charge or the charge output value. For instance, certain charging devices 31, 32 are set as a reference. Then, in a case where the necessity degree of the charge or the charge output value is higher than a predetermined value in an area of the charging devices 31, 32 located around the reference charging devices 31, 32, a region or a zone including the reference charging devices 31, 32 and their surrounding charging devices 31, 32 is set as the predetermined area. With this setting, since an area where the shortage of the charge amount would occur is determined, it is possible to transmit the recommendation information, as same as the above.

In the present embodiment, the acquisition unit 101 corresponds to an acquisition means. The vehicles 21, 22 correspond to an electric vehicle. The charge-necessity-degree prediction unit 102 corresponds to a charge-necessity-degree prediction means. The charge output estimation unit 103 corresponds to a charge output estimation means. The judgment unit 104 corresponds to a judgment means. The information provision unit 105 corresponds to an information provision means.

Second Embodiment

The present embodiment is different from the first embodiment in the contents of the recommendation information concerning the charge. Regarding the same configuration and effects as the first embodiment, except the above difference, they are quoted from their respective descriptions, as necessary.

Since the contents of the control of the acquisition unit 101, the charge-necessity-degree prediction unit 102, the charge output estimation unit 103 and the judgment unit 104 are the same as those of the first embodiment, they will be omitted here.

The information provision unit 105 determines, by the judgment unit 104, vehicles 21, 22 which are linked with the area where the shortage of the charge amount would occur, and provides the recommendation information to the vehicles 21, 22. The vehicles 21, 22 linked with this area are vehicles 21, 22 which are travelling in the area and require no charge. The vehicles 21, 22 requiring no charge are determined by using the information of the remaining capacity of the secondary battery 204 included in the travelling information obtained by the acquisition unit 101. Further, in the recommendation information, the position information of the charging devices 31, 32 installed outside the area is included. For example, in FIG. 1, in a case where the charge output amount of the area A is judged to be higher than the charge output threshold value, a vehicle 21 whose remaining capacity is large among the vehicle group of the vehicles 21 in the area A is provided with the position information of the charging device installed outside the area A, as the recommendation information. Since the information of the predetermined travelling route of the vehicle 21 is included in the travelling information, the information provision unit 105 provides, as the recommendation information, the position information of the charging device that is installed outside the area A and on the predetermined travelling route to the vehicle 21 using the information of the predetermined travelling route.

In the area where the charge output value is higher than the charge output threshold value, since there is the possibility that the shortage of the charge amount will occur, it is desirable to reduce the number of the vehicles which are charged by the charging devices 31, 32 to as small as possible. For this reason, in the present embodiment, by providing the position information of the charging devices 31, 32 installed outside the area to the vehicles 21, 22 travelling in the area where the shortage of the charge amount would occur and having the margin for the remaining capacity, the vehicles 21, 22 are recommended to carry out the charge outside the area. With this provision and recommendation, it is possible to reduce the number of the vehicles which will be charged by the charging devices 31, 32 in the area.

As explained above, in the present embodiment, in the case where the charge output value exceeds the charge output threshold value in the predetermined area, as the recommendation information, the position information of the charging devices 31, 32 installed outside the predetermined area is provided to the vehicles 21, 22 travelling in the predetermined area and also requiring no charge in the predetermined area. Hence, the vehicles 21, 22 receiving the recommendation information can be charged while avoiding the predetermined area which is forecast to be dense with the vehicles 21, 22 for the charge. The user of the vehicle can consequently charge the vehicles 21, 22 more comfortably and efficiently. In addition, since the vehicle requiring no charge is not charged by the charging devices 31, 32 provided in the predetermined area, it is possible to prevent the increase of the charge output in the predetermined area. The shortage of the charge amount in the predetermined area can therefore be prevented.

Third Embodiment

The present embodiment is different from the first embodiment in the contents of the recommendation information concerning the charge. Regarding the same configuration and effects as the first embodiment, except the above difference, they are quoted from their respective descriptions, as necessary.

Since the contents of the control of the acquisition unit 101, the charge-necessity-degree prediction unit 102, the charge output estimation unit 103 and the judgment unit 104 are the same as those of the first embodiment, they will be omitted here.

The information provision unit 105 determines, by the judgment unit 104, vehicles 21, 22 which are linked with the area where the shortage of the charge amount would occur, and provides the recommendation information to the vehicles 21, 22. The vehicles 21, 22 linked with this area are vehicles 21, 22 which are currently being charged in the area and/or vehicles 21, 22 which are going to be charged in the area. The vehicles 21, 22 which are currently being charged in the area are determined from the position information of the vehicles 21, 22. The vehicles 21, 22 which are going to be charged in the area are determined by using the predetermined travelling route and the remaining capacity of the secondary battery 204 of the vehicles 21, 22. In the recommendation information, a charge amount required to travel from a charging position to an outside of the area is included. For example, in FIG. 1, in the case where the charge output amount of the area A is judged to be higher than the charge output threshold value, the vehicles 21, 22 charged by the charging device 31 are provided with information of the charge amount required to travel from the position of the charging device 31 to an outside of the area A, as the recommendation information.

In the area where the charge output value is higher than the charge output threshold value, since there is the possibility that the shortage of the charge amount will occur, it is desirable to suppress the charge amount of the charging devices 31, 32 provided in the area to as small as possible. For this reason, in the present embodiment, by providing the information of the charge amount required to travel to the outside of the area to the vehicles 21, 22 charged in the area where the shortage of the charge amount would occur, the charge amount in the area is suppressed.

As explained above, in the present embodiment, in the case where the charge output value exceeds the charge output threshold value in the predetermined area, as the recommendation information, the information of the charge amount required to travel at least to the outside of the predetermined area is provided to the vehicles 21, 22 which are currently being charged and/or which are going to be charged in the predetermined area. Hence, when the vehicles 21, 22 receiving the recommendation information are charged in the predetermined area, since the charge amount is suppressed, the shortage of the charge amount in the predetermined area can be prevented.

Fourth Embodiment

The present embodiment is different from the first embodiment in the contents of the recommendation information concerning the charge. Regarding the same configuration and effects as the first embodiment, except the above difference, they are quoted from their respective descriptions, as necessary.

The travelling information from the vehicles 21, 22 includes information of a desired time of arrival. The desired time of arrival is fixed, for instance, by being set by the user of the vehicles 21, 22 upon riding on the vehicle.

Since the contents of the control of the acquisition unit 101, the charge-necessity-degree prediction unit 102, the charge output estimation unit 103 and the judgment unit 104 are the same as those of the first embodiment, they will be omitted here.

The information provision unit 105 determines, by the judgment unit 104, vehicles 21, 22 which are linked with the area where the shortage of the charge amount would occur, and provides the recommendation information to the vehicles 21, 22. The vehicles 21, 22 linked with this area are vehicles 21, 22 which are going to be charged in the area. The vehicles 21, 22 which are going to be charged in the area are determined by using the position information, the predetermined travelling route and the remaining capacity of the secondary battery 204 of the vehicles 21, 22. In the recommendation information, the information of type of the charging devices 31, 32 is included. The type of the charging devices 31, 32 is, for instance, a quick charging device, a normal charging device, etc. For example, in FIG. 1, in the case where the charge output amount of the area A is judged to be higher than the charge output threshold value, the vehicle 21 or the vehicle 22 charged by the charging device 31 is provided with the information concerning the type of the charging device 31, as the recommendation information, according to the desired time of arrival and an estimated charge start time.

In the area where the charge output value is higher than the charge output threshold value, since there is the possibility that the shortage of the charge amount will occur, it is desirable to suppress the charge amount of the charging devices 31, 32 provided in the area to as small as possible. For this reason, in the present embodiment, the vehicles 21, 22 charged in the area where the shortage of the charge amount would occur and having a margin for a departure time are determined from the desired time of arrival and the estimated charge start time. Then, by providing the information of type of the charging devices 31, 32 to the vehicles 21, 22 to charge the vehicle by using the normal charging device, the charge amount in the area is suppressed.

As explained above, in the present embodiment, in the case where the charge output value exceeds the charge output threshold value in the predetermined area, as the recommendation information, the type of the charging devices 31, 32 is provided to the vehicles 21, 22 which are going to be charged in the predetermined area. Hence, in a case where there is a sufficient time until the departure after starting the charge, since the vehicles 21, 22 receiving the recommendation information are charged by the normal charging device whose power load is lighter than that of the quick charging device, the shortage of the charge amount in the predetermined area can be prevented.

Here, the present embodiment judges, on the basis of the desired time of arrival included in the travelling information, whether there is the sufficient time from the charge start to the departure. However, the presence or absence of the sufficient time could be judged from a desired charge completion time that is inputted by the user of the vehicles 21, 22 upon charging. That is, for example, when the user of the vehicles 21, 22 inputs the desired charge completion time upon starting the charge, the charging devices 31, 32 transmit a signal including this desired charge completion time to the information provision device 1. The information provision device 1 determines an area that includes the charging devices 31, 32 with this signal being a trigger. Then, as described above, the judgment is made as to whether the charge output value exceeds the charge output threshold value in the area, and the recommendation information is transmitted to the vehicles 21, 22 and/or the charging devices 31, 32 according to the judgment result.

Fifth Embodiment

The present embodiment is different from the first embodiment in the contents of the recommendation information concerning the charge. Regarding the same configuration and effects as the first embodiment, except the above difference, they are quoted from their respective descriptions, as necessary.

Since the contents of the control of the acquisition unit 101, the charge-necessity-degree prediction unit 102, the charge output estimation unit 103 and the judgment unit 104 are the same as those of the first embodiment, they will be omitted here.

The information provision unit 105 determines, by the judgment unit 104, vehicles 21, 22 which are linked with the area where the shortage of the charge amount would occur, and provides the recommendation information to the vehicles 21, 22. The vehicles 21, 22 linked with this area are vehicles 21, 22 which are travelling toward the area. The vehicles 21, 22 travelling toward the area are determined from the position information of the vehicles 21, 22 and the predetermined travelling route of the vehicles 21, 22. In the recommendation information, information of a travelling route that does not include the area is included. For example, in FIG. 1, in the case where the charge output amount of the area A is judged to be higher than the charge output threshold value, the vehicle 22 travelling toward the area A is provided with the information of the travelling route not including the area A, as the recommendation information.

In the area where the charge output value is higher than the charge output threshold value, since there is the possibility that the shortage of the charge amount will occur, it is desirable to suppress the charge amount of the charging devices 31, 32 provided in the area to as small as possible. Further, in a case where the vehicles 21, 22 travelling toward the area are charged in the area, since there is a risk that a waiting time of the charge or a charge time will be long, it is preferable to carry out the charge while avoiding this area. For these reasons, in the present embodiment, by providing information of a new travelling route which avoids the area to the vehicles 21, 22 travelling toward the area where the shortage of the charge amount would occur, the charge amount in the area is suppressed.

As explained above, in the present embodiment, in the case where the charge output value exceeds the charge output threshold value in the predetermined area, as the recommendation information, the information of the travelling route not including the predetermined area is provided to the vehicles 21, 22 travelling toward the predetermined area. Hence, since the vehicles 21, 22 receiving the recommendation information travel on the new travelling route, it is possible to prevent the vehicles 21, 22 from being charged in the predetermined area. The shortage of the charge amount in the predetermined area can therefore be prevented.

Here, in the present embodiment, although the recommendation information is provided to the vehicles 21, 22 travelling toward the area where the charge output value exceeds the charge output threshold value, the recommendation information could be provided to vehicles 21, 22 which are travelling toward the area and also have a strong possibility of being charged in the area considering the remaining capacity of the secondary battery 204.

Further, in the present embodiment, as the recommendation information, position information of the area could be transmitted to the vehicles 21, 22 travelling toward the area where the charge output value exceeds the charge output threshold value. The vehicles 21, 22 receiving the recommendation information search the travelling route that avoids the area by the navigation system mounted on the vehicles 21, 22. Thus, since vehicles 21, 22 travel while avoiding the area, the shortage of the charge amount in the area can be prevented.

Sixth Embodiment

The present embodiment is different from the first embodiment in the contents of the recommendation information concerning the charge. Regarding the same configuration and effects as the first embodiment, except the above difference, they are quoted from their respective descriptions, as necessary.

Since the contents of the control of the acquisition unit 101, the charge-necessity-degree prediction unit 102, the charge output estimation unit 103 and the judgment unit 104 are the same as those of the first embodiment, they will be omitted here.

The information provision unit 105 determines, by the judgment unit 104, vehicles 21, 22 which are linked with the area where the shortage of the charge amount would occur, and provides the recommendation information to the vehicles 21, 22. The vehicles 21, 22 linked with this area are vehicles 21, 22 which are going to be charged in the area. The vehicles 21, 22 which are going to be charged in the area are determined by using the position information, the predetermined travelling route and the remaining capacity of the secondary battery 204 of the vehicles 21, 22. In the recommendation information, information concerning a waiting time for the charge by the charging devices 31, 32 is included. For example, in FIG. 1, in the case where the charge output amount of the area A is judged to be higher than the charge output threshold value, the vehicle 22 which is going to be charged by the charging device 31 is provided with the information concerning the waiting time for the charge by the charging device 31, as the recommendation information.

Here, the waiting time is calculated between the charging devices 31, 32 and the information provision device 1 by using information of available charging devices 31, 32 in the area, a utilization time of the charging device currently used for the charge, the necessity degree of the charge of the vehicle travelling in the area, etc.

As explained above, in the present embodiment, in the case where the charge output value exceeds the charge output threshold value in the predetermined area, as the recommendation information, the information concerning the waiting time of the charging devices 31, 32 provided in the predetermined area is provided to the vehicles 21, 22 which are going to be charged in the predetermined area. Hence, since the vehicles 21, 22 receiving the recommendation information can be charged in advance in a case where the charging devices 31, 32 exist before the vehicle goes into the predetermined area, the shortage of the charge amount in the predetermined area can be prevented.

Further, in the area where the charge output value exceeds the charge output threshold value, although there is a risk that the waiting time of the charge will be long, the user of the vehicles 21, 22 can effectively utilize the waiting time by getting the information of the waiting time in advance.

Seventh Embodiment

The present embodiment is different from the first embodiment in the contents of the recommendation information concerning the charge. Regarding the same configuration and effects as the first embodiment, except the above difference, they are quoted from their respective descriptions, as necessary.

Since the contents of the control of the acquisition unit 101, the charge-necessity-degree prediction unit 102, the charge output estimation unit 103 and the judgment unit 104 are the same as those of the first embodiment, they will be omitted here.

The information provision unit 105 determines, by the judgment unit 104, vehicles 21, 22 which are linked with the area where the shortage of the charge amount would occur, and provides the recommendation information to the vehicles 21, 22. The vehicles 21, 22 linked with this area are vehicles 21, 22 which are going to be charged in the area. The vehicles 21, 22 which are going to be charged in the area are determined by using the position information, the predetermined travelling route and the remaining capacity of the secondary battery 204 of the vehicles 21, 22. In the recommendation information, information concerning a charge time by the charging devices 31, 32 is included. For example, in FIG. 1, in the case where the charge output amount of the area A is judged to be higher than the charge output threshold value, the vehicle 22 which is going to be charged by the charging device 31 is provided with the information of the charge time required for the charge by the charging device 31, as the recommendation information.

Here, the charge time is calculated between the charging devices 31, 32 and the information provision device 1 by using the charge output amount of the charging devices 31, 32 in the area, a utilization time of the charging device currently used for the charge, etc.

As explained above, in the present embodiment, in the case where the charge output value exceeds the charge output threshold value in the predetermined area, as the recommendation information, the information concerning the charge time of the charging devices 31, 32 provided in the predetermined area is provided to the vehicles 21, 22 which are going to be charged in the predetermined area. In the area where the charge output value exceeds the charge output threshold value, since there is a risk that the shortage of the charge amount will occur, limitations might be imposed on the charge output amount. Thus, in the area, there is a case where the charge time is longer than the usual. In the present embodiment, by receiving the recommendation information, since the vehicles 21, 22 can be charged in advance in a case where the charging devices 31, 32 exist before the vehicle goes into the predetermined area, the charge amount in the predetermined area can be suppressed.

The invention claimed is:
1. An information provision device comprising:
an acquisition unit configured to acquire travelling information of an electric vehicle on which a secondary battery is mounted;
a charge output estimation unit configured to estimate, on the basis of the travelling information, a charge output value of a charging device which is provided in a predetermined area and charges the secondary battery of the electric vehicle, the charging device being separate from the electric vehicle and from the information provision device;
a judgment unit configured to judge, on the basis of the estimated charge output value, whether there is a risk that shortage of a charge amount of the charging device will occur in the predetermined area; and
an information provision unit configured to provide recommendation information concerning charge of the electric vehicle to the electric vehicle according to a judgment result of the judgment unit.

2. The information provision device as claimed in claim 1, wherein:
the travelling information includes at least one of a remaining capacity of the secondary battery, information of a predetermined travelling route of the electric vehicle, topographical information of a road on which the electric vehicle travels, traffic information of a road on which the electric vehicle travels or weather information of a place where the electric vehicle travels.

3. The information provision device as claimed in claim 1, wherein:
the recommendation information includes at least one of position information of the charging device, information of a charge amount of the electric vehicle, information of type of the charging device, information of a travelling route of the electric vehicle, information of a waiting time of charge of the charging device or information of a charge time of the charging device.

4. The information provision device as claimed in claim 1, wherein:
the travelling information includes a remaining capacity of the secondary battery, information of a predetermined travelling route of the electric vehicle and position information of the electric vehicle, and
when the judgment unit judges that there is the risk that shortage of the charge amount will occur in the predetermined area, the information provision unit provides position information of a charging device that is provided outside the predetermined area, as the recommendation information, to an electric vehicle that travels toward the predetermined area, and
when the judgment unit judges that there is not the risk that shortage of the charge amount will occur in the predetermined area, the information provision unit does not provide position information of the charging device that is provided outside the predetermined area, as the recommendation information, to an electric vehicle that travels toward the predetermined area.

5. The information provision device as claimed in claim 1, wherein:

the travelling information includes a remaining capacity of the secondary battery, information of a predetermined travelling route of the electric vehicle and position information of the electric vehicle, and when the judgment unit judges that there is the risk that shortage of the charge amount will occur in the predetermined area, the information provision unit provides position information of a charging device that is provided outside the predetermined area, as the recommendation information, to an electric vehicle that travels in the predetermined area and requires no charge in the predetermined area, and when the judgment unit judges that there is not the risk that shortage of the charge amount will occur in the predetermined area, the information provision unit does not provide position information of the charging device that is provided outside the predetermined area, as the recommendation information, to an electric vehicle that travels in the predetermined area and requires no charge in the predetermined area.

6. The information provision device as claimed in claim 1, wherein:

the travelling information includes a remaining capacity of the secondary battery, information of a predetermined travelling route of the electric vehicle and position information of the electric vehicle, and when the judgment unit judges that there is the risk that shortage of the charge amount will occur in the predetermined area, the information provision unit provides information of a charge amount required to travel at least to an outside of the predetermined area, as the recommendation information, to an electric vehicle that is currently being charged in the predetermined area or an electric vehicle that is going to be charged in the predetermined area, and when the judgment unit judges that there is not the risk that shortage of the charge amount will occur in the predetermined area, the information provision unit does not provide information of a charge amount required to travel at least to an outside of the predetermined area, as the recommendation information, to an electric vehicle that is currently being charged in the predetermined area or an electric vehicle that is going to be charged in the predetermined area.

7. The information provision device as claimed in claim 1, wherein:

the travelling information includes a remaining capacity of the secondary battery, information of a predetermined travelling route of the electric vehicle and position information of the electric vehicle, and when the judgment unit judges that there is the risk that shortage of the charge amount will occur in the predetermined area, the information provision unit provides information of type of the charging device, as the recommendation information, to an electric vehicle that is going to be charged in the predetermined area, and when the judgment unit judges that there is not the risk that shortage of the charge amount will occur in the predetermined area, the information provision unit does not provide information of type of the charging device, as the recommendation information, to an electric vehicle that is going to be charged in the predetermined area.

8. The information provision device as claimed in claim 1, wherein:

the travelling information includes a remaining capacity of the secondary battery, information of a predetermined travelling route of the electric vehicle and position information of the electric vehicle, and when the judgment unit judges that there is the risk that shortage of the charge amount will occur in the predetermined area, the information provision unit provides information of a travelling route that does not include the predetermined area, as the recommendation information, to an electric vehicle that travels toward the predetermined area, and when the judgment unit judges that there is not the risk that shortage of the charge amount will occur in the predetermined area, the information provision unit does not provide information of a travelling route that does not include the predetermined area, as the recommendation information, to an electric vehicle that travels toward the predetermined area.

9. The information provision device as claimed in claim 1, wherein:

the travelling information includes a remaining capacity of the secondary battery, information of a predetermined travelling route of the electric vehicle and position information of the electric vehicle, and when the judgment unit judges that there is the risk that shortage of the charge amount will occur in the predetermined area, the information provision unit provides information of a waiting time of the charging device, as the recommendation information, to an electric vehicle that is going to be charged in the predetermined area, and when the judgment unit judges that there is not the risk that shortage of the charge amount will occur in the predetermined area, the information provision unit does not provide information of a waiting time of the charging device, as the recommendation information, to an electric vehicle that is going to be charged in the predetermined area.

10. The information provision device as claimed in claim 1, wherein:

the travelling information includes a remaining capacity of the secondary battery, information of a predetermined travelling route of the electric vehicle and position information of the electric vehicle, and when the judgment unit judges that there is the risk that shortage of the charge amount will occur in the predetermined area, the information provision unit provides information of a charge time of the charging device, as the recommendation information, to an electric vehicle that is going to be charged in the predetermined area, and when the judgment unit judges that there is not the risk that shortage of the charge amount will occur in the predetermined area, the information provision unit does not provide information of a charge time of the charging device, as the recommendation information, to an electric vehicle that is going to be charged in the predetermined area.

11. The information provision device as claimed in claim 1, wherein:

the judgment unit is configured to judge that, when the charge output value is greater than a predetermined charge output threshold value, there is the risk that shortage of the charge amount will occur in the predetermined area, and the charge output threshold value is set on the basis of a rated output value of the charging device provided in the predetermined area.

12. The information provision device as claimed in claim 1, wherein:

the judgment unit is configured to judge whether there is the risk that shortage of the charge amount will occur in the predetermined area, on the basis of the charge output value, a maximum power supply value in the predetermined area and electric power demand except the charging device in the predetermined area.

13. The information provision device as claimed in claim 1, wherein:

the judgment unit is configured to judge that, when the charge output value is greater than a predetermined charge output threshold value, there is the risk that shortage of the charge amount will occur in the predetermined area, and the charge output threshold value is set on the basis of the travelling information.

14. An information provision method for a system including an information provision device, the method comprising:

a step that, by a CPU, the system acquires travelling information of an electric vehicle on which a secondary battery is mounted;

a step that, by a CPU, the system estimates, on the basis of the travelling information, a charge output value of a charging device which is provided in a predetermined area and charges the secondary battery of the electric vehicle, the charging device being separate from the electric vehicle and from the information provision device;

a step that, by a CPU, the system judges, on the basis of the estimated charge output value, whether there is a risk that shortage of a charge amount of the charging device will occur in the predetermined area; and a step that, by a CPU, the system provides recommendation information concerning charge of the vehicle to the electric vehicle according to a judgment result.

* * * * *